Oct. 4, 1966     L. H. MORIN     3,276,078
DIE FOR PRODUCING AN INTERMOLDED NUMBER WHEEL
Filed Feb. 12, 1964
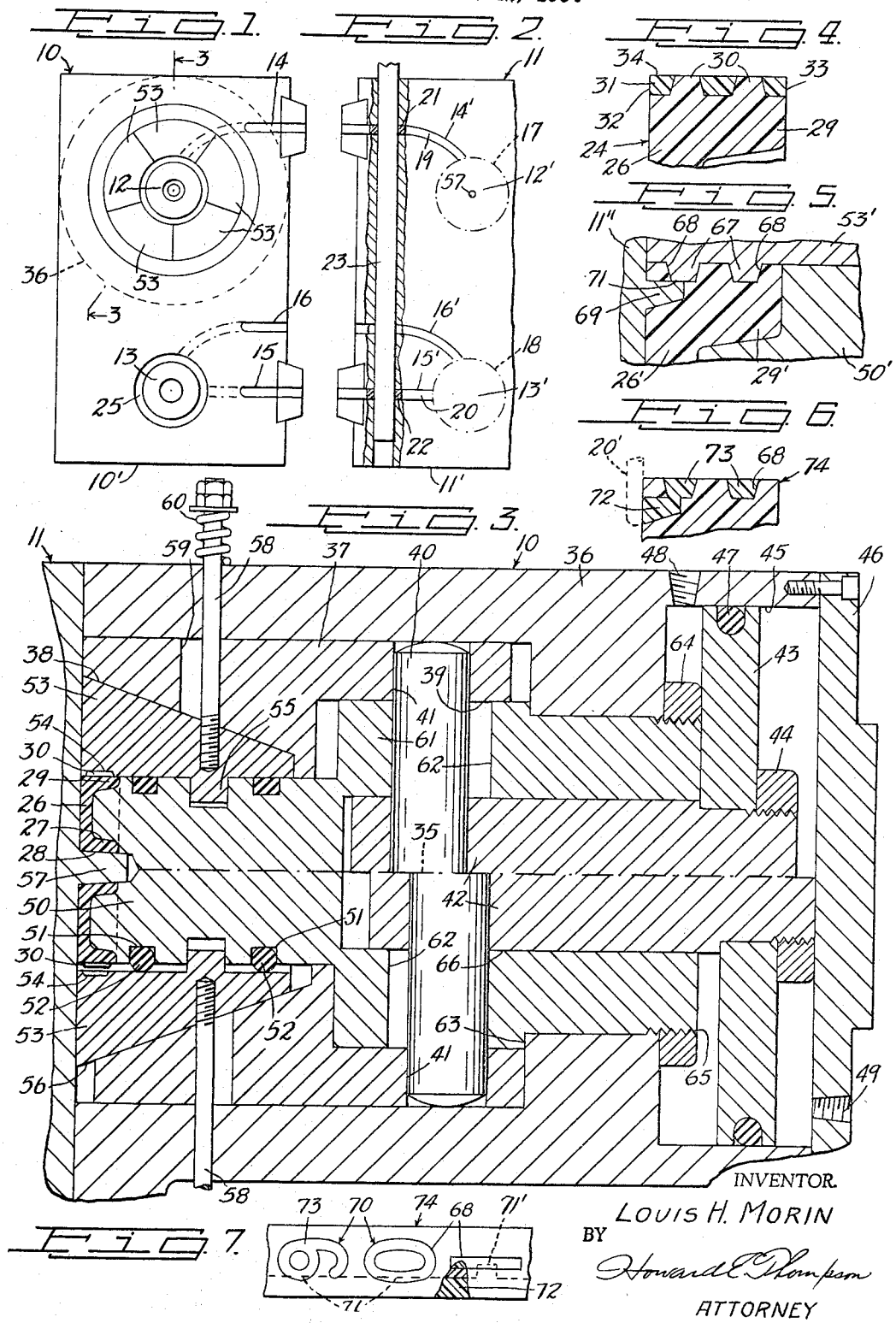
INVENTOR.
LOUIS H. MORIN
BY
Howard E. Thompson
ATTORNEY United States Patent Office 3,276,078
Patented Oct. 4, 1966

3,276,078
DIE FOR PRODUCING AN INTERMOLDED
NUMBER WHEEL
Louis H. Morin, 125 Beechwood Ave., Bronx, N.Y.
Filed Feb. 12, 1964, Ser. No. 344,422
1 Claim. (Cl. 18—36)

This application constitutes a continuation-in-part of a companion application, Serial Number 344,421 filed February 12, 1964, in disclosing a different end product, as well as a different die structure and method of producing such end product.

This invention relates to a die for the production of number wheels, wherein the main body part of the wheel is fashioned from one color plastic material and the peripheral portion of the body part includes a facing part fashioned from a color plastic contrasting to the plastic material of the body part, so that the numbers on the periphery of the wheel will be clearly readable. More particularly, the invention, in one of its forms, deals with a die structure for the production of a wheel of the character defined, wherein the body part includes at one side of the peripheral portion thereof an annular groove having portions exposed to numeral recesses on the peripheral surface of the wheel to extend the plastic material of the facing part to said numeral recesses.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of one die part employed in producing number wheels of the kind under consideration.

FIG. 2 is a similar view of part of the companion die part, illustrating a transfer rod arranged in sectional portions of the die and illustrating, in full lines and partially in section, the runners extending to the molded parts at the two molding stations in dot-dash lines.

FIG. 3 is an enlarged sectional view on the broken line 3—3 of FIG. 1, illustrating in the upper portion of said figure the parts in closed molding position and, in the lower part of said figure, the parts in open position, the upper and lower parts being divided centrally by a dot-dash line, and said figure illustrating a modification over the showing in FIG. 1 of the drawing.

FIG. 4 is a sectional detail view of the peripheral portion of a wheel showing one method of construction.

FIG. 5 is a sectional detail view through the peripheral portion of a molded wheel, showing the die structure for forming said wheel.

FIG. 6 is a view, similar to FIG. 4, showing the wheel made according to the method and structure of FIG. 5 and indicating, in dotted lines, the runner or sprue which is trimmed from the finished product; and FIG. 7 is a face view of a number wheel, such as shown in FIG. 6, and produced in accordance with the die structure shown in FIG. 5 to clearly indicate how the plastic material of the facing part extends to different numerals on the surface of the resulting wheel, part of the construction being shown in section.

While the general structure is dealt with in more detail in the companion application hereinbefore referred to, in FIGS. 1 and 2 of the drawing, I have diagrammatically illustrated, at least in part, the face views of dies which I employ, the structure of one of these dies being shown in enlarged sectional detail in FIG. 3, in which a slight modification over the showing in FIG. 1 is illustrated.

In FIG. 1, the die 10 may be said to comprise the main cavity die and, in FIG. 2, 11 represents the associated die forming portions of the cavity of the number wheel being formed. These dies have two molding stations 12, 12'; 13, 13' with runner cavities 14, 14'; 15, 15' extending to the cavities, the dies having supplemental runner cavities, as at 16, 16', for reception of the molded product as formed at the station 12, 12', for example, the product outlined in dot-dash lines at 17 in FIG. 2 when said product is positioned at the second station 13, 13' in forming the finished molded product 18, as indicated in dot-dash lines in said figure. The runners 19 and 20 extending to the respective cavities, as indicated in FIG. 2 of the drawing, include ring portions 21, 22 formed around a transfer core rod 23 utilized in feeding 17 to the second station, where 18 is formed, it being further apparent that, realizing that 18 is formed on the rod 23, then the finished molded product, such as 24 of FIG. 4, where the peripheral portion only of the product is shown has been fed to a trimming station beyond the lower surfaces 10', 11' of the dies where the runners are trimmed off, as is common in other castings or moldings of the type and kind under consideration and as will be dealt with in description of a modified form of end product, as later described.

Considering FIG. 1 of the drawing, it will be apparent that the die 10 includes a cavity portion 25 for reception of the first formed or body part of the wheel, as at 17, when it is positioned at the station forming the resulting product, as at 18 in FIG. 2.

Now, considering FIG. 3 of the drawing, the formation of the body part 26 of the product 24 is diagrammatically illustrated, in section, and it will be apparent that this body part comprises a central hub portion 27, with a tapered bore 28 formed therein. At the periphery of the body part 26 is a rim 29, upon which the numerals 30 are molded, the numerals being simply outlined in this showing. However, in FIG. 4 of the drawing, portions of one of the numerals are clearly illustrated in section at 30 projecting from the surface of the rim 29. The body part 26, after its formation at the first station 12, is positioned at the second station 13 and, at said station, the facing part 31 is formed on the periphery of the rim 29 and around all of the numerals extending circumferentially of the rim 29. In this form of construction and method of procedure, the facing part 31 may be said to comprise a sheath covering the entire periphery of the rim with its side edges 32, 33 in alinement with corresponding edges of the rim, as clearly noted in FIG. 4, and with the exposed surfaces of all of the numerals as, for example, the numeral 30 in alinement with the exposed surface 34 of the facing part or sheath 31. In connection with the foregoing, it will be understood that the cavity 25, at the second station 13, is shaped to form 31 on the body part by the plastic material injected through the runner passage or passages 15, 15'.

In FIG. 3 of the drawing, I have shown in detail the general structure of the die 10 and, above the central dot-dash line 35, the parts of the die are shown in the normal closed position; whereas, below said dot-dash line, parts of the die have been shown in open position to free the molded body part 26 for transmission to the second station when the dies 10 and 11 are separated, as will be apparent. This particular showing has been done to avoid a reproduction of the same structure in another view, which would unnecessarily enlarge upon the sheets of drawings employed.

36 represents the die body, in which is arranged a sleeve 37 having a tapered socket 38 in one end thereof. The other end of the sleeve has a large diameter bore 39 and transversing this bore is a pin 40 mounted in apertures 41 in the sleeve. The pin 40 is also mounted in the stud or rod 42 of a piston 43 mounted on 42 by a nut, as seen at 44, the piston operating in a cylinder 45 at the end of the die body 36, this cylinder being closed by a cover plate 46. The periphery of the piston 43 supports an O-packing ring 47. At 48 is shown an air admission and discharge port for the inner end of the cylinder 45. A similar port 49 is formed in the plate 46 and opens into the outer end of the cylinder 45 for controlling air actuation of the piston 43 in movement of the sleeve 37 into the operative position shown at the top of FIG. 3, or into the retracted or inoperative position as shown at the lower portion of FIG. 3.

At 50 is shown the core which, at its end, is shaped to partially form the hub 27 and rim 29 of the body 26 and also the thin wall structure of the body between the hub and the rim, as clearly illustrated. The core 50 has spaced grooves 51 for receiving yieldable O-rings 52 operating in conjunction with a plurality of web-shaped die slides 53, five of which are employed, as will appear from a consideration of FIG. 1 of the drawing, each of these dies having on inner surfaces thereof, adjacent their outer exposed faces, pairs of numeral cavities, two of which are illustrated as at 54 in FIG. 3 of the drawing, thus the five slides 53 will form the ten numeral characters ZERO to NINE, inclusive, upon the outer surface of the rim 29 of the body 26, one of these characters being illustrated, in part, as at 30 in FIG. 4 of the drawing. The core 50 is also grooved between the grooves 51 to receive inwardly projecting keys 55, grooves being of sufficient depth to provide radial movement of the slides 53, as shown from the position at the top of FIG. 3, to the position illustrated at the bottom of FIG. 3, outer surfaces of the slides being bevelled or tapered, as seen at 56 in FIG. 3, to operate in conjunction with the tapered socket 38 of the sleeve 37. In one use of the dies, the characteristics of the O-rings alone can be utilized in moving the slides 53 from the upper position of FIG. 3 where the O-rings 52 are de-formed, as clearly shown, to the lower position of FIG. 3 in movement of the slides into open position, clearing the molded numerals, facilitating free ejection of the molded body 26 from the core 50 and the face of the die 10 as and when the die 11 is in open position and the molded body 26 has been positioned between spaced surfaces of the two dies by the core rod 23, preparatory to movement of the body 26 to the second casting station, as previously described. It will appear, from a consideration of FIG. 3, that the die 11 includes a core pin portion 57, which forms the tapered bore 28 in the hub 27. However, in operation, it will be understood that the die slides 53 are moved into open position before the die 11 is separated from the die 10, after which, the die 11 is moved into open position and the pin 57 is removed from the bore 28, with the core rod 23 positioned between the then spaced dies.

As another alternative, the die 10 may have a series of rods 58 coupled with each of the die slides 53, one only of these rods being shown complete in FIG. 3. These rods pass through elongated apertures 59 in the sleeve 37 and ends of the rods project beyond the die body 36, which is generally cylindrical in form, as indicated by the dotted showing in FIG. 1 of the drawing. Adjustably supported on the outer ends of the rods 58 are springs 60 tensioned to urge the die slides 53 into the position shown at the lower portion of FIG. 3 and, with the O-rings 52 employed, this operation is further accentuated by return of these rings to their normal circular cross-sectional form from the extended form shown at the upper portion of FIG. 3. The core 50 has a large diameter portion 61 which operates in the bore 39 of the sleeve. This portion has an elongated aperture 62, in which the pin 40 operates. This large diameter portion 61 is reduced to form a shoulder 63 seating in the die body 36, the core being held in fixed position in the die body by a nut 64 in threaded engagement with the core, as seen at 65. The large diameter portion 61 of the core is apertured, as seen at 66, to receive the stud or rod 42 in its sliding movement in the die body through action of the piston 43.

Turning now to FIG. 5 of the drawing, in this figure is partially shown on an enlarged scale a modified form of die slide 53' and a modified core 50', together with a modified die 11'' and at 26' is shown a modified form of wheel body from that shown in FIG. 4. In the showing in FIGS. 3 and 4 of the drawing, the numeral characters are formed on the periphery of the rim 29 as projections on the rim; whereas, in FIG. 5, the die slides 53' have projecting characters 67 forming corresponding numeral recesses 68 in the periphery of the rim 29' of the molded wheel body 26', in other words, a reversal of the teachings as shown in FIGS. 3 and 4. With this structure, the die 11' has an annular ring-like core 69 extending into the surface of the rim 29' sufficiently to contact the several numeral cavities as, for example, ZERO and NINE at 70 in FIG. 7 of the drawing or, in other words, to overlap part of the recesses 68, as indicated at 71 in FIG. 5 and in dotted lines in FIG. 7, so that the ring facing part 72, which fills the recess formed by the annular core ring 69, can extend into and fill the recesses 68, as seen clearly at 73 in FIG. 6 of the drawing. Portions of the core 69 can be fashioned to form extensions to extend the molded facing part 71 inwardly, as illustrated at 71' in FIG. 7, to reach, for example, the numeral ONE or any other numeral or character to be formed on the surface of the resulting wheel 74, shown, in part, in FIGS. 6 and 7 of the drawing. The broken-away portion of FIG. 7 is to illustrate that 72 does extend to the cavity 68 forming the numeral ONE.

It will be understood that the present disclosure deals with the production of one type and kind of wheel by way of illustration. However, the wheel may have any type and kind of characterizations thereon, depending upon the use to which the wheel is employed. Considering FIGS. 4 and 6 of the drawing, it will be apparent that, with both forms of wheel, the rim of the wheel has portions exposed at the periphery of the wheel which form, in conjunction with the facing part molded on the periphery of the wheel, the characters or numerals spaced circumferentially of the wheel. In the one instance, the exposed portions constitute the character, as at 30 in FIG. 4; whereas, in the other instances, the exposed portions of the rim extend around edge portions of all of the characters or numerals and form the side edge portions of the periphery of the wheel.

Returning to a consideration of FIGS. 1 and 2 of the drawing, it will appear that, in forming intermolded characterized wheels of multi-colored plastics, the molded body part, such as 26, 26', is formed at the first station 12, 12', while the facing part, preferably of a color distinctly contrasting to the color of the body part, is formed at the second molding station 13, 13', keeping in mind that a pre-formed body part 26, 26' has been positioned at said second casting station to receive the facing part which, in the showing in FIG. 4, comprises the part 31 or, in FIG. 6, the molded portion 73, including the annular ring 72 at one side of the body part. In FIG. 6, the removal of one of the runners, for example, the runner 20, is indicated in part, in dotted lines at 20' in said figure. The annular molded ring 72, in addition to performing its primary function, serves also to anchor the various numerals in the periphery of the rim. It is also pointed out, at this time, that, in using such materials as nylon, Delrin and the like in forming the body part and facing parts, in actual fusion takes place at engaged surfaces of these parts, which definitely retains the parts in firm engagement with each other when the parts are directly molded one upon the other.

In molding the facing part 31 at the second station, it will be understood that means will be required to extend the facing material to letters or characters having enclosures such, for example, as the numerals ZERO, FOUR, SIX, EIGHT and NINE. In accomplishing this result, the die 11 will have suitably spaced projections, similar to 69 of FIG. 5, registering with the enclosures in the numerals mentioned so that, in the molding operation at the second station, material of the facing can extend into such enclosures in the same manner as the material extends into the recesses 68 in forming the character 73 as noted by the ring 72 and particularly the extension, as noted at 71 in dotted lines in FIG. 7. In other words, extensions like 71' only will be employed leading to the enclosure numerals ZERO, FOUR, SIX, EIGHT and NINE. This structure and method is disclosed in detail in the companion application filed of equal date herewith.

Having fully described my invention, what I claim as new and desire to secure by Letters Patent is:

A die structure for producing character wheels including intermolded plastic parts of contrasting colors, said structure comprising a pair of relatively movable dies with a transfer core rod disposed between said dies, said dies having spaced first and second molding stations, one die including at the first station core means forming the body, hub and rim of one part of a wheel and a plurality of radially movable die slides having means forming characters on the rim of said part, the first die having means receiving the first part at said second station, means in the first die for collectively moving all of said slides into operative position, means for moving the slides into nonmolding position in movement of the last named means into inoperative position, said last two means comprising relatively movable elements one group of which carries mold cavities of rim characters for said wheels and are radially spring biased away from the axis of said die and the other group of elements having each an inclined surface adapted to interact with a complemental surface on said first mentioned elements so that upon axial longitudinal movement of said second mentioned elements the first elements move radially toward or away from the die cavity for said rim characters and thus may disengage from said rim characters to permit longitudinal removal of a newly formed wheel from the dies, a cylinder and piston connected to said second mentioned group of elements for moving the same longitudinally of the axis of the dies by power, the third named means comprising a cavity at the second station, said transfer rod moving the first part into position registering with said cavity when the dies are open, and means at the second station for forming on the rim of the first part a facing part intermolded with said second named means in producing on the periphery of the wheel rim, and the resulting end product, portions of both of said parts, wherein the material of one part forms the characters on said surface.

References Cited by the Examiner

UNITED STATES PATENTS

| | | | |
|---|---|---|---|
| 1,259,379 | 3/1918 | Eachel | 235—1 |
| 1,592,568 | 7/1926 | Orth | 235—1 |
| 2,288,187 | 6/1942 | Gits et al. | 264—274 XR |
| 2,714,949 | 8/1955 | Morin | 264—328 XR |
| 2,812,548 | 11/1957 | Quinche et al. | |
| 3,016,579 | 1/1962 | Schlitzkus | 264—247 |
| 3,031,722 | 5/1962 | Gits | 264—246 |
| 3,126,429 | 3/1964 | Saffir | 264—20 |
| 3,148,413 | 9/1964 | Latrubesse | 264—255 XR |

ROBERT F. WHITE, *Primary Examiner.*

LEO SMILOW, *Examiner.*

C. G. COVELL, T. J. CARVIS, *Assistant Examiners.*